United States Patent
Fukazawa et al.

(10) Patent No.: US 8,481,224 B2
(45) Date of Patent: Jul. 9, 2013

(54) DIRECT METHANOL FUEL CELL AND ANODE USED THEREIN

(75) Inventors: Taishi Fukazawa, Tokyo (JP); Yoshihiro Akasaka, Kawasaki (JP); Jungmin Song, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/358,939

(22) Filed: Jan. 26, 2012

(65) Prior Publication Data

US 2012/0171597 A1   Jul. 5, 2012

Related U.S. Application Data

(63) Continuation of application No. PCT/JP2009/063436, filed on Jul. 28, 2009.

(51) Int. Cl.
  *H01M 8/10*   (2006.01)
(52) U.S. Cl.
  USPC .......................................................... 429/482
(58) Field of Classification Search
  None
  See application file for complete search history.

(56) References Cited

U.S. PATENT DOCUMENTS

| | | | |
|---|---|---|---|
| 7,759,019 B2 | 7/2010 | Mei et al. | |
| 2004/0009388 A1* | 1/2004 | Faguy | 429/42 |
| 2005/0238948 A1* | 10/2005 | Mei et al. | 429/40 |

FOREIGN PATENT DOCUMENTS

| | | |
|---|---|---|
| JP | 2001-338651 | 12/2001 |
| JP | 2004-119072 | 4/2004 |
| JP | 2005-026174 | 1/2005 |
| JP | 2005-310714 | 11/2005 |
| JP | 2006-253030 | 9/2006 |
| JP | 2007-103070 | 4/2007 |

OTHER PUBLICATIONS

Lu et al, Development and characterization of a silicon-based micro direct methanol fuel cell, Electrochim Acta, 49 (2004), 821-828.*
Genji Jimbo, et al., "Handbook of Microparticles", Asakura Publishing Co., Ltd., 1991, pp. 256-259.
Sohachiro Hyakawa ed., "Method for Measurement of Physical Properties of Powders", Asakura Publishing Co., Ltd., 1978, pp. 150-153.
G. Q. Lu, et al., "Development and Characterization of a Silicon-Based Micro Direct Methanol Fuel Cell", Electrochimica Acta, 49, 2004, pp. 821-828.
International Search Report issued Oct. 6, 2009 in PCT/JP2009/063436 filed Jul. 28, 2009.
Michael C. Tucker, et al.; "The Pore Structure of Direct Methanol Fuel Cell Electrodes"; Journal of the Electrochemical Society, 2005, vol. 152, No. 9, pp. A1844-A1850.

* cited by examiner

*Primary Examiner* — Ula C Ruddock
*Assistant Examiner* — Daniel Gatewood
(74) *Attorney, Agent, or Firm* — Oblon, Spivak, McClelland, Maier & Neustadt, L.L.P.

(57) ABSTRACT

According to one embodiment, an anode for a direct methanol fuel cell includes an anode catalyst layer containing a noble metal catalyst and a proton-conductive polyelectrolyte. A log differential pore volume distribution curve measured by a mercury intrusion porosimetry of the anode catalyst layer has a peak within a pore diameter range of 0.06 to 0.3 μm and satisfies the following relationship:

$$0.5 \leq (V_1/V_0) \leq 0.9$$

wherein $V_0$ is a cumulative pore volume of pores having a diameter of from 0.02 to 1 μm, as measured by a mercury intrusion porosimetry, and $V_1$ is a cumulative pore volume of pores having a diameter of from 0.02 to 0.2 μm, as measured by a mercury intrusion porosimetry.

20 Claims, 2 Drawing Sheets

DIRECT METHANOL FUEL CELL AND ANODE USED THEREIN

CROSS-REFERENCE TO RELATED APPLICATIONS

This application is a Continuation Application of PCT Application No. PCT/JP2009/063436, filed Jul. 28, 2009, the entire contents of which are incorporated herein by reference.

FIELD

Embodiments described herein relate generally to a direct methanol fuel cell (DMFC) and an anode used therein.

BACKGROUND

In DMFCs, a crossover phenomenon in a fuel from an anode side to a cathode side is significant. Since crossover causes not only loss of a fuel but also decrease in the potential of a cathode, it is desirable to repress crossover as possible. In order to increase the properties of DMFCs sufficiently, it is also demanded that an anode catalyst layer has high diffusability of a fuel.

In order to improve fuel diffusability, optimization of the pore structure of an anode catalyst layer is suggested (see, for example, JP-A 2001-338651 (KOKAI) and JP-A 2005-26174 (KOKAI)). For example, a pore diameter is controlled. As techniques for improving the pore structure of a catalyst layer, changing of a carrier material, incorporation of a different carrier material, a water-repellent or hydrophilic treatment, and introduction of a pore forming agent, and the like are present, but all of these techniques are not sufficient. Even if a large amount of a catalyst is used, demanded properties cannot be obtained.

DETAILED DESCRIPTION

In general, according to one embodiment, an anode for DMFCs includes an anode catalyst layer containing a noble metal catalyst and a proton-conductive polyelectrolyte. A log differential pore volume distribution curve measured by a mercury intrusion porosimetry of the anode catalyst layer has a peak within a pore diameter range of 0.06 to 0.3 μm, and satisfies the following relationship:

$$0.5 \leq (V_1/V_0) \leq 0.9$$

wherein $V_0$ is a cumulative pore volume of pores having a diameter of from 0.02 to 1 μm, as measured by a mercury intrusion porosimetry, and $V_1$ is a cumulative pore volume of pores having a diameter of from 0.02 to 0.2 μm, as measured by a mercury intrusion porosimetry.

Hereinafter embodiments will be explained with reference to the drawings. It is to be noted that throughout the drawings, the same parts are designated by the same symbols, and the overlapped descriptions are omitted. Furthermore, the drawings are schematic ones, and the relationship between the thickness and plane size, the ratio of the thicknesses of the each layers, and the like are different from actual ones. In addition, the relationship and ratio between the sizes are different from each other in some parts of the drawings.

Figure 1:
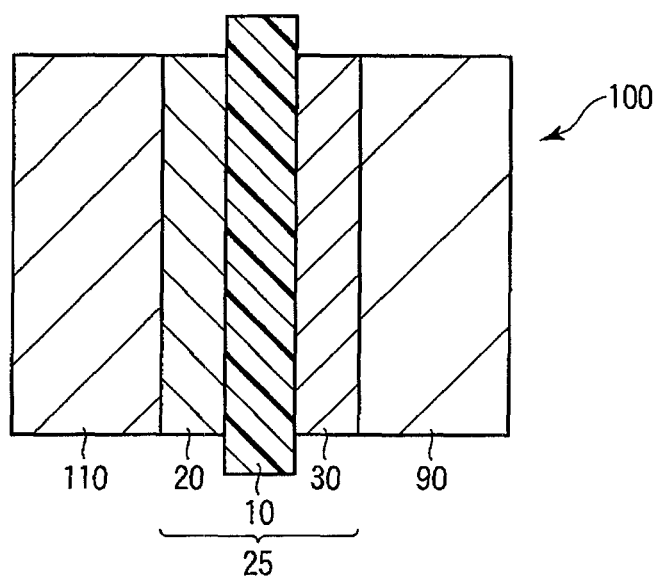
FIG. 1 is a cross-sectional view of the cell of a DMFC.

As shown in FIG. 1, in a cell 100, a DMFC, a CCM (Catalyst Coated Membrane) 25 is constituted by interposing an electrolyte membrane 10 between an anode catalyst layer 20 and a cathode catalyst layer 30. An anode GDL (gas diffusion layer) 110 is disposed on the outside of the anode catalyst layer 20, and a cathode GDL 90 is disposed on the outside of the cathode catalyst layer 30.

Although it is not depicted, an anode MPL (dense water-repelling layer) is present between the anode catalyst layer 20 and the anode GDL 110, and a cathode MPL is present between the cathode catalyst layer 30 and the cathode GDL 90.

The anode GDL 110 feeds a fuel to the anode catalyst layer 20, and the cathode GDL 90 feeds an oxidizer gas to the cathode catalyst layer 30. As the fuel, for example, an aqueous methanol solution can be used, and examples of the oxidizer gas may include oxygen. Such GDLs are generally constituted by a sheet-like porous electroconductive material, and also have a function as a current collector.

An anode is constituted by the anode GDL 110 and the anode catalyst layer 20, and a cathode is constituted by the cathode catalyst layer 30 and the cathode GDL 90. A laminate comprising an anode, an electrolyte membrane and a cathode is referred to as a membrane electrode assembly (MEA).

When a DMFC having such constitution is operated, an aqueous methanol solution as a fuel is fed from a fuel storage unit (not depicted) to the anode. Air as an oxidizer is fed to the cathode catalyst layer 30.

In the anode catalyst layer 20, methanol and water react to generate carbon dioxide, protons and electrons. The protons pass through the electrolyte membrane 10 and reach the cathode. On the other hand, in the cathode catalyst layer 30, the protons and oxygen and also the electrons that have reached the cathode catalyst layer 30 through an outer circuit are combined to generate water.

The generated electrons are utilized as an electrical power by passing them through the outer circuit, and the generated water is released from the cathode to outside of the system. On the other hand, the carbon dioxide generated in the anode diffuses in the liquid phase fuel in the case when the fuel is directly fed to the cell, and is ejected outside through a gas permeation membrane through which only a gas is permeated.

In order to improve the properties of such DMFC, it is required to feed the above-mentioned reactants smoothly in amounts that are suitable for each electrode, and to eject the reaction product rapidly. Furthermore, it is also necessary for an electrode-catalyst reaction to generate rapidly in a three-phase interface of a catalyst, a proton-conductive polyelectrolyte and a fuel. In addition to these, suppression of the crossover of a fuel is also demanded.

In this embodiment, improvement of the diffusability of a fuel was enabled while maintaining the level of suppression of the crossover of the fuel, by suitably controlling the pore diameter distribution of the anode catalyst layer. As a result, a DMFC having excellent properties could be obtained.

The pore diameter distribution based on a mercury intrusion porosimetry of the anode catalyst layer is measured by the following method by using a measurement apparatus (Shimadzu Autopore, Type 9520). The pore diameter distribution refers to a log differential pore volume distribution curve and a cumulative pore volume curve.

The anode catalyst layer is cut into a predetermined size (12×25 mm) to prepare a sample, which is folded and housed in a measurement cell. A measurement is conducted under a condition of an initial pressure of about 7 kPa (about 1.0 psia, corresponding to a pore diameter of about 180 μm). An average value of three samples is used as a measurement result. When the pore diameter of the top of the maximum peak of a log differential pore volume distribution curve (the mode diameter of the peak) is present in the range of 0.06 to 0.3 μm, it is recognized that a peak is present in this range.

The analysis principle of the mercury intrusion porosimetry is based on the Washburn's equation (B).

$$D = -4\gamma \cos \theta / P \qquad \text{Equation (B)}$$

In the equation, P is a pressure applied, D is a pore diameter, $\gamma$ is the surface tension of mercury (480 dyne·cm$^{-1}$), and $\theta$ is the contact angle between mercury and the wall surface of the pore: 140°. Since $\gamma$ and $\theta$ are constants, the relationship between the applied pressure P and the pore diameter D can be obtained from the Washburn's equation, and the pore diameter and the volume distribution thereof can be derived by measuring the mercury intrusion volume at that time. For the specifics on the measurement method, principle and the like, see "Handbook of Microparticles", Genji Jimbo et al, Asakura Publishing Co., Ltd. (1991), "Method for Measurement of Physical Properties of Powders", Sohachiro Hayakawa ed., Asakura Publishing Co., Ltd. (1978), and the like.

The volumes $V_0$ and $V_1$ of pores each having a diameter within a predetermined range can be obtained from a cumulative pore volume curve.

As mentioned above, since the position of the peak of the log differential pore volume distribution curve was defined together with the volume ratio of the pores each having a predetermined diameter, the anode catalyst layer in this embodiment could improve the diffusability of the fuel while maintaining the level of suppression of the crossover of the fuel.

When $V_1/V_0$ is less than 0.5, pores having a small pore diameter are decreased, thereby the surface area is decreased. As a result, the three-phase interface that is the contact point between the catalyst, proton-conductive polyelectrolyte and fuel is decreased, and this becomes a factor of decrease in cell properties. On the other hand, when $V_1/V_0$ becomes larger than 0.9, the catalyst layer becomes too dense. In this case, diffusion of the fuel to the inside of the pores becomes difficult, and this becomes a factor of decrease in cell properties. It is more preferable that the pores have a volume ratio in the range of 0.6 to 0.8, and it is more preferable that the diameter distribution of the pores has a peak in the range of 0.1 to 0.2 μm.

It is preferable that at least a part of the noble metal included in the anode catalyst layer is Pt or a Pt alloy. The Pt or Pt alloy accounts for, more preferably at least 50% by mass, and most preferably 100% by mass of the noble metal catalyst. Examples of the Pt alloy may include PtRu alloys, PtRuSn alloys and PtFe alloys, and specifically include PtRu alloy catalysts (PtRu Black HiSPEC6000, manufactured by Johnson & Matthey) and the like.

The noble metal catalyst is used as microparticles. The average diameter of the microparticles is preferably from about 2 to about 5 nm in view of the density of the active sites and stability. Microparticles having an average diameter within this range can ensure a sufficient surface area without any inconvenience. In addition, the average diameter of the catalyst microparticles can be obtained by, for example, X-ray diffraction.

The catalyst microparticles may be carried by an electroconductive carrier. This case is advantageous in view of stability since aggregation between the catalyst microparticles can be suppressed. Examples of the electroconductive carrier may include carbon carriers such as acetylene black, carbon black, active carbon, carbon nanotubes, carbon fiber and carbon nanohorns. Considering improvement of fuel diffusability, carbon nanotubes, carbon fiber and carbon nanohorns are preferable. Besides the above-mentioned carbon carriers, graphite carbon and the like can also be used.

Examples of the carbon powder on which the noble metal catalyst is carried may include a Pt/C catalyst manufactured by E-TEK (HP 40-wt % Pt on Vulcan XC-72R), TEC10E70TPM manufactured by Tanaka Kikinzoku Kogyo.

In order for the electroconductive carrier to carry the catalyst microparticles, any method can be adopted. For example, a solid phase reaction process, a solid phase-liquid phase reaction process, a liquid phase process, and a gas phase process, and the like may be exemplified. Examples of the liquid phase process may include an impregnation process, a precipitation process, a coprecipitation process, colloid process, and an ion exchange process. The average diameter of the electroconductive carrier is preferably from about 20 to about 80 nm. When the average diameter is within this range, a sufficient surface area can be ensured without any inconvenience. The average diameter of the electroconductive carrier can be obtained by, for example, X-ray diffraction.

As the proton-conductive polyelectrolyte, for example, solutions of perfluorocarbonsulfonic acid, ion exchange resins manufactured by The Dow Chemical Company, other ionic copolymers (ionomers) and the like may be used. Specifically, a solution containing Nafion (trademark) manufactured by Dupont by a concentration of 5 wt % (Aldich SE-20092) may be exemplified.

The anode catalyst layer can be prepared by applying an anode catalyst layer material (slurry) to a sheet made of PTFE (polytetrafluoroethylene) and drying. In the preparation of the anode catalyst layer material, at first, water is added to catalyst microparticles and stirring is conducted thoroughly. A proton-conductive polyelectrolyte and an organic solvent are then added, and mixing dispersion is conducted to give an anode catalyst layer material.

Examples of the organic solvent may include 1-propanol, 2-propanol, ethylene glycol and ethanol. Such organic solvents can be used solely or as a combination of two or more kinds. For the dispersing treatment, general dispersing machines such as a magnetic stirrer, a ball mill, a sand mill, a bead mill, a paint shaker and Nanomizer, and the like can be used.

In application of the anode catalyst layer material, an ultrasonic nozzle spray application process can be adopted. Specifically, the anode catalyst material is sprayed repetitively on a base material by using a spray having an ultrasonic head to form a coating film. The obtained coating film can be dried by a conventional method such as forced drying by a drier, or the like. It is desirable that the anode catalyst layer after drying comprises the noble metal catalyst by an amount (loading amount) of from about 1 to about 15 mg/cm$^2$.

The pore diameter distribution of the anode catalyst layer can be controlled by, for example, the following procedure. In the case of a spray application process, the diameter distribution of the pores is attributed to the liquid droplet size in spraying. Therefore, by using an ultrasonic nozzle that can produce large liquid droplets, the peak of the log differential pore volume distribution curve can be shifted to the larger diameter side. On the other hand, in order to shift the peak to the smaller diameter side, an ultrasonic nozzle producing small liquid droplets may be used.

Furthermore, the volume distribution of the pores is attributed to the amount of spraying per hour. Therefore, in the case when the amount of spraying per unit time is small, the volume ratio of the pores ($V_1/V_0$) is increased. On the other hand, in the case when the amount of spraying per unit time is great, the volume ratio of the pore is decreased.

Considering these, a pore structure having a desired pore diameter distribution can be obtained.

An electrolyte membrane 10 can be prepared, for example, by subjecting a perfluorocarbonsulfonic acid membrane to a pretreatment. Examples of the perfluorocarbonsulfonic acid membrane may include Nafion (trademark) 112 (Dupont). Such perfluorocarbonsulfonic acid membrane is used, for example, after being cut into a predetermined size of from about 10 to about 100 mm in length and from 10 to 100 mm in width. The pretreatment is described in (G. Q. Lu, et al. Electrochimica Acta 49 (2004) 821-828) and the like, and hydrogen peroxide and sulfuric acid are used.

The cathode catalyst layer 30 has a porous structure comprising the noble metal catalyst and the proton-conductive polyelectrolyte. For this porous structure of the cathode catalyst layer, the diameter distribution and volume distribution of the pores are not specifically specified. Except for this difference, the cathode catalyst layer can be prepared in a similar manner to the case of the above-mentioned anode catalyst layer. For example, a carbon powder on which the noble metal catalyst is carried may be coated with the proton-conductive polyelectrolyte.

The cathode catalyst layer is obtained by applying a material for the cathode catalyst to a PTFE sheet and drying. It is desirable that the cathode catalyst layer after drying comprises the catalyst by an amount (loading amount) of from about 1 to about 5 mg/cm$^2$.

The CCM 25 is obtained by interposing the electrolyte membrane 10 between the anode catalyst layer and the cathode catalyst layer. In order to obtain the CCM 25, firstly, the anode catalyst layer and the cathode catalyst layer, which are in the form of being mounted on PTFE sheets respectively, are cut into predetermined sizes. The cut anode catalyst layer 20 and cathode catalyst layer 30 are contacted to the electrolyte membrane 10 and heat-pressed. Thereafter the PTFE sheet may be removed.

An anode MPL and an anode GDL 110 are disposed on the anode catalyst layer 20 of the CCM 25. The anode MPL is generally formed on a porous electroconductive material as an anode GDL by using a slurry comprising a water-repellent material and an electroconductive material.

Examples of the water-repellent material may include, preferably water-repellent organic synthesized resins such as PTFE, tetrafluoroethylene-perfluoroalkyl vinyl ether copolymers (PFA), tetrafluoroethylene-hexafluoropropylene copolymers (FEP), polychlorotrifluoroethylene (PCTFE), polyvinylidene fluoride (PVDF), polyvinyl fluoride (PVF), tetrafluoroethylene-ethylene copolymers (ETFE) and amorphous fluorine resins.

Preferable examples of the electroconductive material are electroconductive carbons such as furnace black, acetylene black and graphitized black.

As the anode GDL 110, porous electroconductive materials such as carbon paper and carbon fiber can be used.

From the viewpoint of suppression of the crossover of methanol, it is preferable that the anode GDL 110 has a thickness of 200 μm or more. On the other hand, in order to keep the basic properties of a fuel cell, it is desirable that the anode GDL 110 has a thickness of 500 μm or less. It is more preferable that the anode GDL has a thickness in the range of 250 to 400 μm.

A fuel feeding means (not depicted) for feeding a fuel (methanol) is disposed on the outside of the anode GDL 110.

The methanol fuel has a concentration of preferably from 0.5 to 3 M, more preferably of from 0.5 to 2 M.

On the other hand, a cathode MPL and a cathode GDL 90 are disposed on the cathode catalyst layer 30 of the CCM 25. Also for the cathode side, the MPL and GDL can be constituted by similar materials to those for the anode side. An oxidizer gas feeding means (not depicted) for feeding air as an oxidizer gas to the cathode GDL 90 is disposed on the outside of the cathode GDL 90.

The anode catalyst layer included in the DMFC according to this embodiment has a porous structure having a specific pore diameter distribution. As a result, the catalyst utilization ratio was increased and thus a sufficient battery output could be ensured, thereby a DMFC having a high output could be obtained.

Hereinafter embodiments of the present invention will be explained with referring to specific examples.

PtRu Black HiSPEC6000 (manufactured by Johnson & Matthey) was prepared as a noble metal catalyst, and Aldrich SE-20092 was prepared as a proton-conductive polyelectrolyte.

The obtained slurry was applied to a PTFE sheet by an ultrasonic nozzle spray process. Specifically, a rotatable drum having a diameter of a 150 mm was wrapped up in a PTFE sheet (50 mm in width) and rotated at 500 rpm. An ultrasonic nozzle spray was fixed at a distance of about 1 cm from the PTFE sheet. This spray was reciprocated repeatedly to right and left along the PTFE sheet. The transfer distance of the spray was 50 mm. The slurry was delivered to the ultrasonic nozzle at a liquid delivery amount of about 1 cc/min to initiate spraying, and the spraying was repeated until a predetermined amount of catalyst loading was achieved. At that time, the coating surface was subjected to forced drying by a drier simultaneously with the spraying to form an anode catalyst layer. The obtained anode catalyst layer is designated as No. 1. The catalyst loading amount in the anode catalyst layer was 10 mg/cm$^2$.

Next, various anode catalyst layers having different pore structures were prepared. The obtained anode catalyst layers are designated as Nos. 2 to 11. Similarly to No. 1, the catalyst loading amount in the anode catalyst layer was 10 mg/cm$^2$ in anode catalyst layers Nos. 2 to 11. Anode catalyst layers Nos. 2 to 7 were prepared by applying a slurry according to a similar method to that in the case of No. 1. Using different ultrasonic nozzles, anode catalyst layers were prepared by changing the size of the liquid droplets to be sprayed, the liquid delivery amount, and the like.

In the preparation of anode catalyst layers Nos. 8 to 11, a convenient spray having no ultrasonic nozzle mechanism was used. Examples of such a spray may include Anest Iwata Eclipse series HP-CS air guns.

For each of the anode catalyst layers after drying, the loading amount of the metal catalyst was obtained by inductively coupled plasma (ICP). For each anode catalyst layer, the pore diameter distribution was examined based on a mercury intrusion porosimetry (Shimadzu AutoPore, Type 9520). The measured pore diameter distribution also comprises the pore diameter distribution for the PTFE sheet that supports the anode catalyst layer. The pore diameter distribution of the anode catalyst layer was obtained by removing the pore diameter distribution for the sheet, and the peak position of the log differential pore volume distribution curve was obtained. Furthermore, the cumulative pore volume at from 0.02 to 1 μm ($V_0$) and the cumulative pore volume at from 0.02 to 0.2 μm ($V_1$) were obtained from the cumulative pore volume curve, and the volume ratio ($V_1/V_0$) was calculated.

The results thereof are summarized in the following Table 1.

TABLE 1

| No. | ($V_1/V_0$) | Peak position of pore diameter |
|---|---|---|
| 1 | 0.8 | 0.17 |
| 2 | 0.9 | 0.3 |
| 3 | 0.6 | 0.08 |
| 4 | 0.8 | 0.2 |
| 5 | 0.5 | 0.1 |
| 6 | 0.9 | 0.15 |
| 7 | 0.75 | 0.16 |
| 8 | 0.75 | 0.05 |
| 9 | 0.46 | 0.5 |
| 10 | 0.4 | 0.2 |
| 11 | 0.95 | 0.09 |

Figure 2:
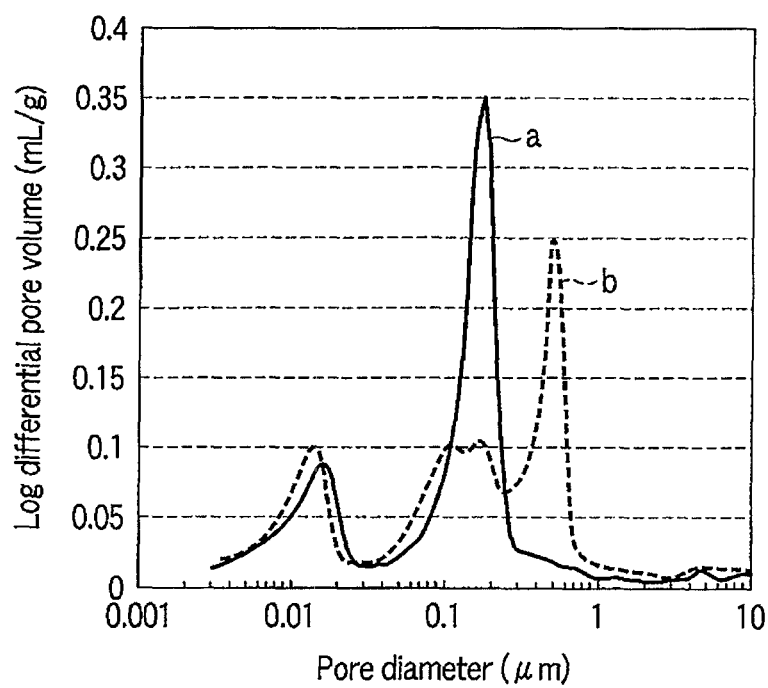
FIG. 2 is a log differential pore volume distribution curve obtained based on a mercury intrusion porosimetry.

*)
$V_1$: Volume of pores having a diameter of from 0.02 to 0.2 μm
$V_0$: Volume of pores having a diameter of from 0.02 to 1 μm For anode catalyst layers No. 1 and No. 9, the log differential pore volume distributions obtained based on a mercury intrusion porosimetry are shown as curve a and curve b, respectively, in the graph of FIG. 2. As shown in curve a, anode catalyst layer No. 1 has a peak pore diameter of the log differential pore volume distribution curve in the range of 0.06 to 0.3 μm. On the other hand, as shown in curve b, anode catalyst layer No. 9 has a peak pore diameter of the log differential pore volume distribution curve of more than 0.3 μm.

Figure 3:
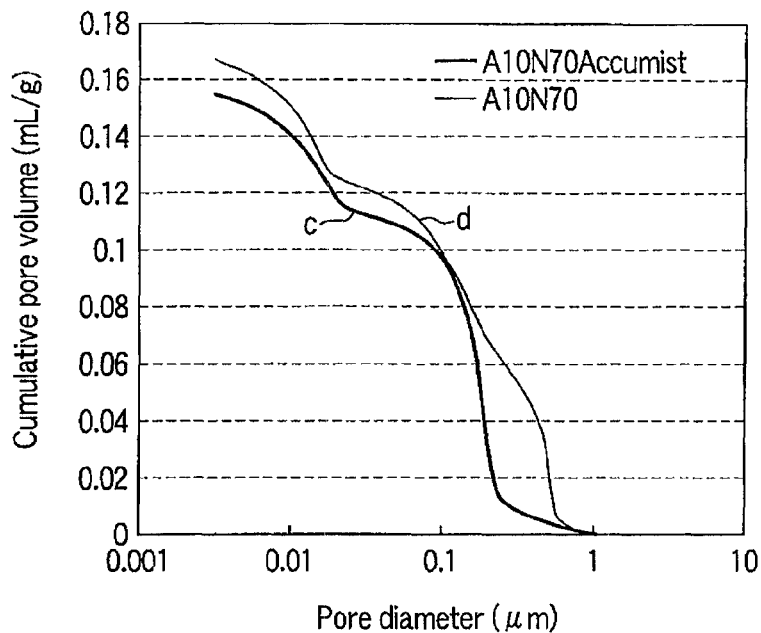
FIG. 3 is a cumulative pore volume curve obtained based on a mercury intrusion porosimetry.

For anode catalyst layers No. 1 and No. 9, the cumulative pore volumes obtained based on a mercury intrusion porosimetry are shown as curve c and curve d, respectively, in the graph of FIG. 3. For anode catalyst layer No. 1, $V_0$ is about 0.12 mL/g, and $V_1$ is about 0.1 mL/g. Therefore, the volume ratio ($V_1/V_0$) is about 0.8, which is in the range of 0.5 to 0.9.

With respect to anode catalyst layer No. 9, $V_0$ is about 0.13 mL/g, and $V_1$ is about 0.06 mL/g. Therefore, the volume ratio ($V_1/V_0$) is about 0.46.

DMFCs Nos. 1 to 11 were prepared by using anode catalyst layers Nos. 1 to 11, respectively. Firstly, Nafion (trademark) 112 was prepared, and was cut into a size of about 40 mm in length and about 50 mm in width. Next, according to (G. Q. Lu, et al. Electrochimica Acta 49 [2004] 821-828), a pretreatment was performed with hydrogen peroxide and sulfuric acid (either one may also be used) to give the electrolyte membrane 10.

On the other hand, a carbon powder on which the noble metal catalyst was carried (HP 40 wt % Pt on Vulcan XC-72R (manufactured by E-TEK)) and a proton-conductive polyelectrolyte (Aldich SE-20092) were dispersed by mixing to prepare a material for the cathode catalyst layer. The obtained material was applied to a PTFE sheet, and dried to give a cathode catalyst layer.

The anode catalyst layer was cut into a size of 30 mm in length and 40 mm in width together with a PTFE sheet supporting the anode catalyst layer. Similarly, the cathode catalyst layer was cut into a size of 30 mm in length and 40 mm in width together with a PTFE sheet.

The cut anode catalyst layer was contacted to one surface of the electrolyte membrane, and the cut cathode catalyst layer was contacted to another surface. In this state, heat-pressing was performed for about 3 minutes at 125° C. and 10 kg/cm². The PTFE sheet was removed to give a CCM 25 that was composed of a laminate in which the electrolyte membrane 10 was interposed between the anode catalyst layer 20 and the cathode catalyst layer 30. The CCM 25 had a thickness of about 90 μm, and both the anode catalyst layer 20 and the cathode catalyst layer 30 had a thickness of about 30 μm.

Carbon paper that had been subjected to a water-repellant treatment as the anode GDL 110 was disposed on the anode catalyst layer 20 of the CCM 25 through the anode MPL. Specifically, TGPH-120, 30 wt %. Wetproofed (manufactured by E-TEK) that had been subjected to a water-repellant treatment with about 30 wt % of PTFE was used.

A fuel feeding means (not depicted) for feeding a fuel to the anode GDL 110 was disposed on this anode GDL 110.

The cathode GDL 90 was disposed on the cathode catalyst layer 30 of the CCM 25 through the cathode MPL. As the cathode GDL, Kat GDL LT-2500-W (manufactured by E-TEK) was used. It has a thickness of about 360 μm. An oxidizer gas feeding means (not depicted) for feeding air as an oxidizer gas is disposed on the cathode GDL 90 to prepare a DMFC.

An electrical power generation test was conducted for the obtained DMFC. A fuel was fed to the anode GDL by using the fuel feeding means, and an oxidizer was fed from the cathode GDL by using the oxidizer feeding means to operate the DMFC. The fuel was an aqueous methanol solution having a concentration of 1.4 M, and was fed at a flow rate of 0.7 cc/min. The oxidizer was air having an oxygen concentration of 20.5% and a humidity of 30%, and was fed at a flow rate of 60 cc/min.

At that time, the temperature that was measured by a temperature sensor (not depicted) that is disposed on the fuel feeding means and the oxidizer feeding means was adjusted to 60° C. by a temperature controller, which is not depicted, and preheating of the air and fuel was not conducted. The cell properties were evaluated by measuring the current density and cell voltage.

Figure 4:
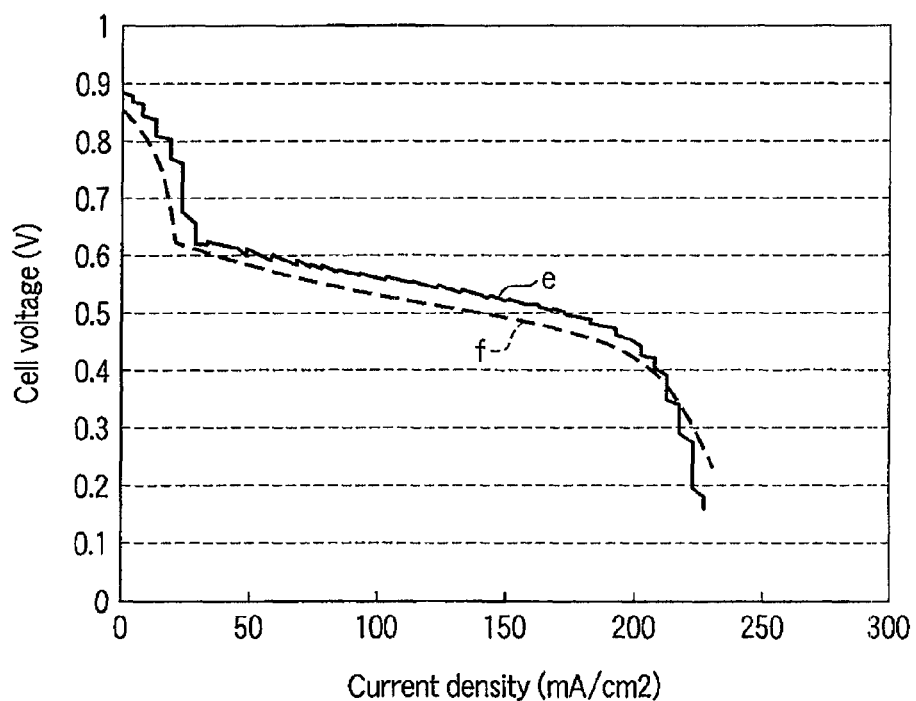
FIG. 4 is a graph showing the cell voltage.

FIG. 4 shows the result for the No. 1 DMFC as curve e, and the result for the No. 9 DMFC as curve f. When the cell voltages at 150 mA/cm² are compared, the voltage is 0.52 V for the No. 1 DMFC, whereas the voltage is 0.49 V for the No. 9 DMFC. The difference between these cell voltages was 30 mV, which showed the superiority of the No. 1 DMFC.

Furthermore, the catalyst utilization ratio in the anode catalyst layer was calculated by an electrochemical CO stripping process. Firstly, inert gas comprising CO gas was passed sufficiently through the anode catalyst layer through the fuel feeding means, thereby CO was adsorbed on the catalyst microparticles. Thereafter excess CO gas was removed by purging with inert gas. Cyclic voltammetry (CV) scanning was performed for continuous two cycles in the range of 0.05 to 0.8 V vs. RHE. From the differential surface area of the peak waveform associated with CO oxidation appearing at from about 0.4 to about 0.6 V vs. RHE in the first cycle and the waveform in the same range in the second cycle, the electrical quantity associated with CO oxidation was calculated. Considering the electrical quantity of CO (420 μC/cm²), the surface area ($A_1$) of the catalyst microparticles on which CO had been adsorbed was calculated.

Using the obtained surface area ($A_1$) and the loading amount of the metal catalyst per sheet of MEA, 0.12 g (which was calculated from a loading amount of noble metal per unit area of 10 mg/cm², and a surface area per sheet of MEA of 12 cm²), the effective specific surface area per unit weight of the metal catalyst ($S_1=A_1/0.12$) was obtained. This value was divided by the specific surface area ($S_0$) of the single body of the metal catalyst (powdery) (=77.5 m²/g) that was separately calculated by a Bet process, thereby a catalyst utilization ratio (T) was calculated.

The effective surface areas ($A_1$) in the respective DMFCs are summarized together with the catalyst utilization ratios (T) and the cell voltages in Table 2. The cell voltages are values at 150 mA/cm².

TABLE 2

| No. | Effective surface area $A_1$ (m²) | Utilization ratio of catalyst T (%) | Cell voltage (V) |
|---|---|---|---|
| 1 | 4.65 | 50 | 0.52 |
| 2 | 4.19 | 45 | 0.515 |
| 3 | 5.58 | 60 | 0.52 |
| 4 | 6.51 | 70 | 0.52 |
| 5 | 5.12 | 55 | 0.52 |
| 6 | 7.44 | 80 | 0.525 |
| 7 | 8.37 | 90 | 0.53 |
| 8 | 3.26 | 35 | 0.49 |
| 9 | 3.26 | 35 | 0.49 |
| 10 | 3.72 | 40 | 0.50 |
| 11 | 4.19 | 45 | 0.50 |

A cell voltage of 0.515 V or more could be obtained in all of the Nos. 1 to 7 DMFCs. On the other hand, the cell voltage was only 0.50 V at most in the Nos. 8 to 11 DMFCs. This trend corresponds well to the catalyst utilization ratio. The catalyst utilization ratio of the anode catalyst layers in the Nos. 1 to 7 DMFCs is 45% at least and 90% at most. In contrast, the catalyst utilization ratio in the anode catalyst layers of the Nos. 8 to 11 DMFCs is only about 45% at most.

In anode catalyst layers Nos. 1 to 7, the peak pore diameter in the log differential pore volume distribution curve obtained based on a mercury intrusion porosimetry is in the range of 0.06 to 0.3 µm, and the volume ratio of the pores satisfies predetermined conditions. Anode catalyst layers Nos. 1 to 7 were prepared by applying a slurry by a specific ultrasonic spray procedure. It is presumed that aggregation of the catalyst microparticles was loosened more than the cases in conventional methods, due to such slurry application process.

As a result, in anode catalyst layers Nos. 1 to 7, pores having small pore diameters increased and the surface area increased. Since the three-phase interface that is the contact point between the catalyst, proton-conductive polyelectrolyte and fuel increased and the increase led to increase in the catalyst utilization ratio, the cell properties were improved in the Nos. 1 to 7 DMFCs.

In an anode catalyst layer that does not satisfy the condition of the pore structure, the cell properties cannot be improved. In anode catalyst layer No. 8 in which the peak pore diameter is less than 0.06 µm, because of the catalyst layer structure having been made excessively dense, diffusion of the fuel is insufficient, and thus the properties are decreased. On the other hand, in anode catalyst layer No. 9 in which the peak pore diameter is more than 0.3 µm, a sufficient surface area cannot be ensured, and thus the properties are decreased.

Since the surface area decreases in anode catalyst layer No. 10 having a volume ratio ($V_1/V_0$) of 0.4, the three-phase interface that is the contact point between the catalyst, proton-conductive polyelectrolyte and fuel is decreased and thus the cell properties are decreased, and in anode catalyst layer No. 11 having a volume ratio ($V_1/V_0$) of 0.95, the catalyst layer become too dense and the fuel is difficult to diffuse into the inside of the pores, and thus the cell properties are decreased.

In such cases, the catalyst is not utilized effectively even the loading amount of the catalyst is equivalent, and thus the Nos. 8 to 11 DMFCs are poor in cell properties.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An anode for a direct methanol fuel cell comprising:
   an anode catalyst layer comprising a noble metal catalyst and a proton-conductive polyelectrolyte, a log differential pore volume distribution curve, as measured by a mercury intrusion porosimetry, of the anode catalyst layer, having a peak within a pore diameter range of 0.06 to 0.3 µm, and satisfying the following relationship:

$$0.5 \leq (V_1/V_0) \leq 0.9$$

wherein $V_0$ is a cumulative pore volume of pores having a diameter of from 0.02 to 1 µm, as measured by a mercury intrusion porosimetry, and $V_1$ is a cumulative pore volume of pores having a diameter of from 0.02 to 0.2 µm, as measured by a mercury intrusion porosimetry.

2. The anode according to claim 1, wherein the following relationship is satisfied:

$$0.6 \leq (V_1/V_0) \leq 0.8.$$

3. The anode according to claim 1, wherein the peak of the log differential pore volume distribution curve exists in a range of 0.1 to 0.2 µm.

4. The anode according to claim 1, further comprising an electroconductive carrier that carries the noble metal catalyst.

5. The anode according to claim 4, wherein the electroconductive carrier is selected from the group consisting of carbon nanotubes, carbon nanofibers and carbon nanohorns.

6. The anode according to claim 1, wherein at least a part of the noble metal catalyst is Pt or a Pt alloy.

7. A direct methanol fuel cell comprising:
   the anode according to claim 1,
   a cathode, and
   an electrolyte membrane interposed between the anode and the cathode.

8. The anode according to claim 1, wherein the noble metal catalyst is microparticles.

9. The anode according to claim 8, wherein an average diameter of the microparticles is 2 to 5 nm.

10. The anode according to claim 1, wherein the proton-conductive polyelectrolyte is at least one selected from the group consisting of a solution of perfluorocarbonsulfonic acid, an ion exchange resin, and an ionic copolymer.

11. The anode according to claim 1, wherein the anode catalyst layer comprises the noble metal catalyst in an amount of 1 to 15 mg/cm².

12. The anode according to claim 4, wherein the electroconductive carrier has an average diameter of from 20 to 80 nm.

13. The anode according to claim 6, wherein the Pt or the Pt alloy accounts for at least 50% by mass of the noble metal catalyst.

14. The anode according to claim 6, wherein the Pt or the Pt alloy accounts for 100% by mass of the noble metal catalyst.

15. The anode according to claim 6, wherein the Pt alloy is at least one selected from the group consisting of a PtRu alloy, a PtRuSn alloy, and a PtFe alloy.

16. The direct methanol fuel cell according to claim 7, wherein the cathode comprises a cathode catalyst layer having a porous structure.

17. The direct methanol fuel cell according to claim 16, wherein the porous structure comprises a noble metal catalyst and a proton-conductive polyelectrolyte.

18. The direct methanol fuel cell according to claim 17, wherein in the cathode catalyst layer, a carbon powder on which the noble metal catalyst is carried is coated with the proton-conductive polyelectrolyte.

19. The direct methanol fuel cell according to claim 17, wherein the cathode catalyst layer comprises the noble metal catalyst in an amount of 1 to 5 mg/cm$^2$.

20. The direct methanol fuel cell according to claim 7, wherein the electrolyte membrane is obtained by subjecting a perfluorocarbonsulfonic acid membrane to a pretreatment.

* * * * *